Patented Nov. 11, 1952

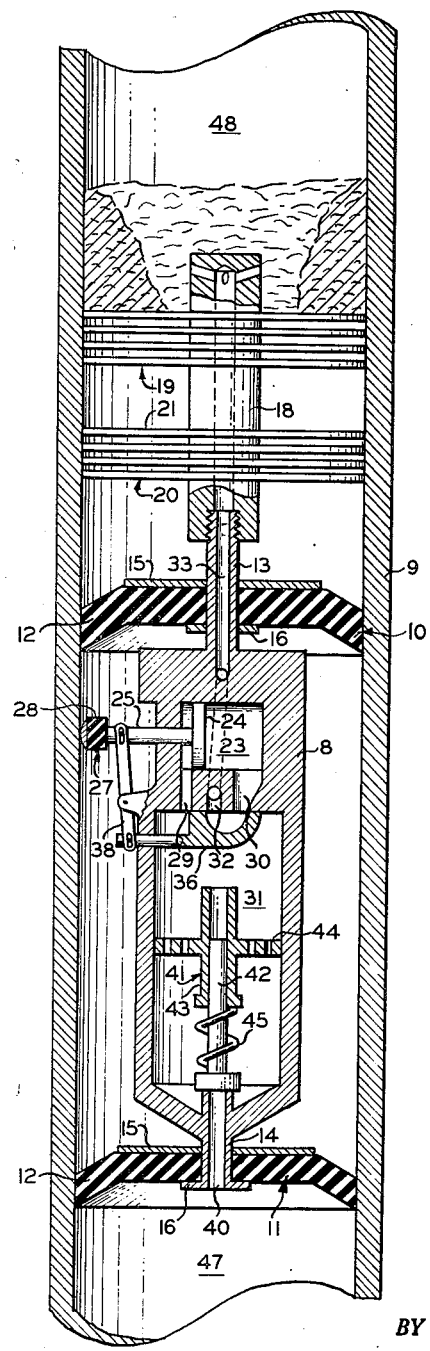

2,617,134

UNITED STATES PATENT OFFICE 2,617,134

LOCATABLE PIPE LINE SCRAPER

Hugh M. Barton, Jr., Brooklyn, N. Y., assignor to Phillips Petroleum Company, a corporation of Delaware Application November 18, 1948, Serial No. 60,791

5 Claims. (Cl. 15—104.06)

This invention relates to a pipe line scraper in which the position of the scraper in the pipe line may be readily determined.

In commercial pipe lines conveying liquid from one location to another, considerable difficulty is experienced due to obstruction of the pipe line by sediment and foreign matter of various types. In order to obviate this difficulty, scrapers or "go devils" are oftentimes passed through the pipe line to clean out such obstructions by scraping the inner surface of the pipe. These devices are propelled by the fluid pressure in the pipe line and, when a heavy deposit is encountered, they often become stuck and thereby produce an additional obstruction in the pipe line.

Heretofore, it has been very difficult to locate such scraping devices when their progress through the pipe line is stopped. In many cases, it has been necessary to send a crew of field men along the pipe in an effort to follow it by listening to the sound made during travel of the scraper through the line. This is an obviously unsatisfactory arrangement particularly where the line is deeply buried, or passes under streams of water, and the difficulties of this method are increased by the fact that the sound made by the scraper is considerably reduced or even eliminated when the scraper is stopped due to an obstruction in the pipe.

It has been proposed to place a quantity of radio active material in the scraper and follow its progress with a counter, electroscope, or other device sensitive to radioactive emissions. This method requires expensive equipment and skilled operators. Hence, it is undesirable for practical use in the field.

It is an object of my invention to provide a pipe line scraper which will produce a characteristic and easily audible sound when progress of the scraper through the pipe line is stopped.

It is a further object of my invention to provide such a device in which the sound is produced only when movement is stopped and not while the device is being propelled through the pipe line in normal fashion.

It is a further object to provide a hydraulically actuated noise-making mechanism operable by the excessive pressure drop produced between the upstream and downstream ends of the scraper when its progress through the pipe line is stopped.

It is a still further object of my invention to provide such a device which is reliable in operation, rugged in construction and economical to use and manufacture.

Various other objects, advantages and features of the invention will become apparent from the following detailed description taken in conjunction with the accompanying drawing, in which the figure is a vertical sectional view of the novel pipe line scraper.

Referring now to the drawing in detail, the device includes an elongated casing 8 which is adapted to pass longitudinally through a pipe line 9. A plug 10 is mounted at the downstream end of the casing and a plug 11 is secured to the upstream end of the casing. Each plug, in the example shown, consists of a disc-like member of resilient material, such as rubber, having flared peripheral portions 12 which are adapted to engage the interior walls of the pipe line 9. The plugs are carried by studs 13 and 14, respectively, which protrude from opposite ends of the casing 8 and they are securely clamped to the studs, as by clamping members 15 and 16. A support 18 is screw threaded to stud 13 and this support carries two sets 19, 20 of scrapers, each set including a series of wire brushes or metal discs 21 suitably secured to support 18 and closely spaced to the interior walls of the pipe line.

A piston chamber 23 is formed in the casing 8 and a piston 24 mounted on a rod 25 is adapted for lateral reciprocatory movement in the piston chamber. During such reciprocatory movement, a striker 27 mounted on the rod 25 periodically engages the sides of the pipe line and produces a distinctive audible noise, thereby revealing the location of the scraper. The striker preferably has a resilient section 28 and a head of metallic material to allow some play in the operation of the striker. The chamber 23 is provided with ports 29, 30 at the respective ends thereof and these ports communicate with a valve chamber 31 formed in the casing 8. A third port 32 is disposed between ports 29 and 30, the port 32 communicating with a conduit 33 which extends through support 18 to the downstream end of the scraper beyond the units 19 and 20. A "D" valve 36 is movable laterally in cooperation with the ports 29, 30 and 32, and this valve is connected by a link 38 with the piston rod 25.

A conduit 40 connects valve chamber 31 with the upstream end of the scraper and this conduit is normally closed by a relief valve 41 which includes a plunger 42 mounted for sliding movement in a support 43 carried by a perforated member 44. The plunger 42 is urged into engagement with the conduit 40 by a spring 45 so that the valve remains closed until a predetermined pressure differential is established between the upstream end of the scraper and the valve chamber 31.

The operation of the novel scraper will now be apparent to those skilled in the art. The unit is placed in a pipe line and is propelled downstream through the pipe line by the fluid pressure therein. In the figure, the scraper would move upwardly through the pipe line 9 due to the higher fluid pressure at the upstream end 47 as compared to that existing at the downstream end 48. As the unit passes through the pipe line, the scraper units 19, 20 remove obstructions, such as sediment, which may have accumulated in the pipe line. During such movement of the scraper, there is not a sufficient pressure differential between the upstream end 47 of the pipe line and chamber 31 as to cause actuation of relief valve 41. Accordingly, the striker 27 is inoperative and no fluid passes from valve chamber 31 through the conduit 33.

Assuming that the scraper encounters an obstruction of such magnitude as to stop further progress thereof, the fluid pressure behind the scraper becomes sufficient to operate relief valve 42, thereby causing liquid from the pipe line to enter chamber 31 through conduit 40. Assuming that the parts of the piston unit are in the position shown, the fluid from chamber 31 enters port 29 and forces piston 24 to move rightwardly. As a result, valve 36 moves in the opposite direction and, when the piston reaches its extreme rightward position, port 29 is connected with port 32 and port 30 is open to valve chamber 31. Accordingly, the pressure within chamber 31 causes the piston to move leftwardly with the result that striker member 27 engages pipe line 9 producing a distinctive and audible impact. During such leftward movement of the piston, the liquid within the piston chamber is expelled through port 29, port 32, and conduit 33, this fluid being discharged at the downstream end 48 of the scraper, thereby tending to wash away the obstruction causing stoppage of the scraper. At the end of this leftward movement of the piston, valve 36 again connects ports 30 and 32 while port 29 is open to valve chamber 31. Accordingly, the piston again moves rightwardly with the result that the liquid in the piston chamber is discharged through ports 30 and 32, and conduit 33 to the downstream end of the scraper. This rightward movement of the piston places striker member 27 in position for a new stroke.

Accordingly, it will be apparent that, when the scraper is stopped, piston 24 is reciprocated and striker 27 periodically engages the wall of the pipe line causing a distinctive noise so that the position of the scraper may be readily identified. In addition, liquid is periodically discharged through conduit 33 to the downstream end of the scraper, tending to remove the obstruction in front of the scraper mechanism. Should the obstruction be removed, the scraper again progresses along the pipe and relief valve 41 is closed thereby discontinuing operation of the striker mechanism.

It is to be understood that various changes and modifications may be made in the disclosed structure without departing from the spirit and scope of the invention. In some cases, the striker 27 may be replaced by a whistle, rattle, or other device for producing a noise different and distinctive from those ordinarily encountered in the vicinity of the pipe line. Also, the piston 24 and its associated valve 36 may be replaced by a turbine, jet, or other equivalent type of hydraulic actuating mechanism. Finally, relief valve 41 may be omitted and valve chamber 31 connected directly to the upstream end of the scraper. The settings of the relief valve may also be so adjusted that the noise-making device may be actuated while utilizing a continuous by-pass flow of liquid around the scraper unit to assist in cleaning or otherwise removing an obstruction from the path of the scraper unit. Such changes and modifications as are included within the scope of the appended claims are incorporated in the invention.

Having described my invention, I claim:

1. A locatable pipe line scraper comprising, in combination, a casing adapted to fit within the interior of a pipe line, a pair of plugs of resilient material disposed, respectively, at the upstream and downstream ends of said casing, a scraper unit protruding beyond the downstream plug including a central support and a series of discs secured to said support in closely spaced relation to the interior wall of the pipe line, a piston chamber formed in said casing, a piston in said chamber mounted for lateral movement and having a striker member attached thereto which is adapted for intermittent engagement with the pipe line as the piston is reciprocated, a valve chamber formed in said casing, valve ports connecting the respective ends of the piston chamber with said valve chamber, a third port positioned in the piston chamber intermediate the aforementioned ports, said third port communicating with a passage for discharging liquid downstream of the scraper unit beyond said metal discs, a valve movable laterally with respect to said ports and mechanically linked to said piston, said valve having an opening formed therein connecting said third port to one of said valve ports when the piston is in one extreme position and connecting said third port with the other valve port when the piston is in its other extreme position, and means for admitting liquid from the upstream end of said scraper to said valve chamber when the pressure differential between the upstream and downstream ends of the scraper exceeds a predetermined value, said last-mentioned means preventing admission of liquid to said valve chamber when said pressure differential is below said predetermined value.

2. A locatable pipe line scraper comprising, in combination, a casing adapted to fit within the interior of a pipe line, a pair of plugs of resilient material disposed, respectively, at the upstream and downstream ends of said casing, a scraper unit protruding beyond the downstream plug including a central support and a series of discs secured to said support in closely spaced relation to the interior wall of the pipe line, a piston chamber formed in said casing, a piston in said chamber mounted for lateral movement and having a striker member attached thereto which is adapted for intermittent engagement with the pipe line as the piston is reciprocated, a valve chamber formed in said casing, valve ports connecting the respective ends of the piston chamber with said valve chamber, a third port positioned in the piston chamber intermediate the valve ports, said third port communicating with a passage for discharging liquid downstream of the scraper unit beyond said metal discs, a valve movable laterally with respect to said ports and mechanically linked to said piston, said valve having an opening formed therein connecting said third port to one of the valve ports when the piston is in one extreme position and connecting said third port with the other valve port when the piston is in its other extreme position, a conduit connecting said valve chamber with the upstream end of said scraper, and a relief valve closing said conduit to admit fluid to said valve chamber when the pressure differential between the upstream and downstream ends of the scraper exceeds a preselected valve.

3. A locatable pipe line tool comprising, in combination, a structure including a chamber adapted to fit within a pipe line having a plug of resilient material at each end thereof for engaging the inner wall of the pipe line whereby the structure is adapted for propulsion through the pipe line by the pressure of the fluid therein, a scraper including a support, and a plurality of scraper members secured to said support, means securing said support and scraper members to the downstream end of said structure, a fluid pressure operated sounding device forming a part of said structure, and means including a relief valve for passing pipe line fluid from the upstream portion of the pipe line through said sounding device to the downstream portion of said pipe line to actuate the same when the pressure differential between the upstream and downstream ends of said structure exceeds a predetermined value, said relieve valve being inoperative to pass fluid through said sounding device when said pressure differential is less than said predetermined value.

4. A pipe line tool including a support, a plurality of scraping members carried by said support and adapted to be closely spaced to the walls of a pipe line, sealing means cooperating with said support and the walls of said pipe line whereby the tool is adapted to be moved through the pipe line by the pressure of the fluid therein, a piston chamber forming a part of said tool, a piston movable laterally in said chamber, said piston having attached thereto a striking member adapted to engage the walls of the pipe line intermittently as the piston is reciprocated, a valve chamber forming a part of said tool having ports communicating with the respective ends of said piston chamber, a laterally movable valve mechanically connected to said piston to alternately open and close said ports responsive to reciprocatory movement of the piston, a conduit for discharging fluid from said piston chamber downstream of said sealing means, a line for passing fluid to said valve chamber from a region of the pipe line upstream of said sealing means, and a relief valve in said line admitting fluid to said valve chamber when the pressure differential between said valve chamber and said upstream region of the pipe line exceeds a predetermined value.

5. A locatable pipe line tool comprising, in combination, a structure including a chamber adapted to fit within a pipe line, resilient sealing means extending from said structure to the inner walls of the pipe line whereby the structure is adapted for propulsion through the pipe line by the pressure of fluid therein, a scraper including a support, and a plurality of scraper members secured to said support, means securing said support and scraper members to the downstream end of said structure, a fluid pressure operated sounding device forming a part of said structure and means including a relief valve for passing pipe line fluid from the upstream portion of the pipe line through said sounding device to the downstream portion of said pipe line to actuate the same when the pressure differential between the upstream and downstream ends of said structure exceeds a predetermined value, said relief valve being inoperative to pass fluid through said sounding device when said pressure differential is less than said predetermined value.

HUGH M. BARTON, Jr.

REFERENCES CITED

The following references are of record in the file of this patent:

UNITED STATES PATENTS

| Number | Name | Date |
| --- | --- | --- |
| 640,822 | Smith | Jan. 9, 1900 |
| 1,058,932 | Zilliox | Apr. 15, 1913 |
| 1,150,419 | Darlington | Aug. 17, 1915 |
| 1,662,429 | Lowy | Mar. 13, 1928 |
| 2,232,018 | Wright | Feb. 18, 1941 |

FOREIGN PATENTS

| Number | Country | Date |
| --- | --- | --- |
| 198,771 | Germany | June 3, 1908 |